(12) United States Patent
Okabe et al.

(10) Patent No.: US 12,523,702 B2
(45) Date of Patent: Jan. 13, 2026

(54) ESTIMATION DEVICE AND ESTIMATION METHOD

(71) Applicant: GS Yuasa International Ltd., Kyoto (JP)

(72) Inventors: Yosuke Okabe, Kyoto (JP); Shigeki Yamate, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 788 days.

(21) Appl. No.: 17/638,027

(22) PCT Filed: Aug. 27, 2020

(86) PCT No.: PCT/JP2020/032370
§ 371 (c)(1),
(2) Date: Feb. 24, 2022

(87) PCT Pub. No.: WO2021/039906
PCT Pub. Date: Mar. 4, 2021

(65) Prior Publication Data
US 2022/0276311 A1  Sep. 1, 2022

(30) Foreign Application Priority Data

Aug. 30, 2019 (JP) .................. 2019-158977
Jul. 30, 2020 (JP) .................. 2020-129607

(51) Int. Cl.
 *G01R 31/374* (2019.01)
 *G01R 31/367* (2019.01)
 (Continued)

(52) U.S. Cl.
 CPC ......... *G01R 31/374* (2019.01); *G01R 31/367* (2019.01); *G01R 31/392* (2019.01); *H01M 10/486* (2013.01)

(58) Field of Classification Search
 CPC .. G01R 31/374; G01R 31/367; G01R 31/392; G01R 31/3648; H01M 10/486; H02J 7/007192
 (Continued)

(56) References Cited

U.S. PATENT DOCUMENTS

2015/0147608 A1\* 5/2015 Lin ................... G01R 31/3648
 429/62
2015/0198675 A1\* 7/2015 Hebiguchi .......... G01R 31/374
 324/430
(Continued)

FOREIGN PATENT DOCUMENTS

CA 3071121 A1 1/2019
EP 2919028 A1 9/2015
(Continued)

OTHER PUBLICATIONS

International Searching Authority, International Search Report and Written Opinion for International Application No. PCT/JP2020/032370, dated Oct. 13, 2020, Japan Patent Office, Tokyo, Japan.
(Continued)

*Primary Examiner* — Edward Tso
*Assistant Examiner* — Aaron Piggush
(74) *Attorney, Agent, or Firm* — Alston & Bird LLP

(57) ABSTRACT

This estimation device is provided with: an acquiring unit which acquires a measurement result from a temperature sensor for measuring temperature at a specific location to which heat generated by an electrical storage device is transmitted; and an observer which, in accordance with input of the measurement result, estimates the temperature at a location where the temperature sensor has not performed measurement.

9 Claims, 8 Drawing Sheets

(51) Int. Cl.
*G01R 31/392* (2019.01)
*H01M 10/48* (2006.01)

(58) Field of Classification Search
USPC .............................. 320/134, 136, 150, 153
See application file for complete search history.

(56) References Cited

U.S. PATENT DOCUMENTS

| | | | |
|---|---|---|---|
| 2015/0285869 A1 | 10/2015 | Wada et al. | |
| 2017/0294689 A1* | 10/2017 | Wada | H01M 10/486 |
| 2019/0064276 A1 | 2/2019 | Kawai et al. | |
| 2019/0094308 A1 | 3/2019 | Fukui | |
| 2019/0195958 A1* | 6/2019 | Suzuki | G01R 31/382 |
| 2019/0235027 A1* | 8/2019 | Sugiura | G01R 31/367 |

FOREIGN PATENT DOCUMENTS

| | | |
|---|---|---|
| JP | 2009-099375 A | 5/2009 |
| JP | 2013-118056 A | 6/2013 |
| JP | 2017-033902 A | 2/2017 |
| JP | 2017-138128 A | 8/2017 |
| JP | 6-274166 B2 | 2/2018 |
| JP | 2018-096953 A | 6/2018 |
| JP | 2018-096954 A | 6/2018 |
| JP | 2018-170144 A | 11/2018 |
| JP | 2019-064218 A | 4/2019 |
| WO | WO-2014/073208 A1 | 5/2014 |
| WO | WO-2014/084117 A1 | 6/2014 |
| WO | WO 2015/198631 A | 12/2015 |
| WO | WO-2016/080111 A1 | 5/2016 |
| WO | WO-2017/022857 A1 | 2/2017 |

OTHER PUBLICATIONS

Doyle, Marc et al. "Comparison of Modeling Predictions with Experimental Data from Plastic Lithium Ion Cells," *Journal of the Electrochemical Society*, vol. 143, No. 6, Jun. 1, 1996, pp. 1890-1903.

Kim, Ui Seong et al. "Modeling the Dependence of the Discharge Behavior of a Lithium-Ion Battery on the Environmental Temperature," *Journal of The Electrochemical Society*, vol. 158, No. 5, Mar. 28, 2011, pp. A611-A618.

Guo, Meng et al. "Single-Particle Model for a Lithium-Ion Cell: Thermal Behavior," *Journal of the Electrochemical Society*, vol. 158, No. 2, Feb. 3, 2011, pp. A122-A132.

Extended European Search Report for European Patent Application No. 20857474.9, dated Sep. 14, 2022, (9 pages), European Patent Office, Munich, Germany.

* cited by examiner

ESTIMATION DEVICE AND ESTIMATION METHOD

CROSS REFERENCE TO RELATED APPLICATIONS

This application is a national stage application, filed under 35 U.S.C. § 371, of International Application No. PCT/JP2020/032370, filed Aug. 27, 2020, which claims priority to and the benefit of Japanese Patent Application Nos. JP 2019-158977 (filed Aug. 30, 2019) and JP 2020-129607 (filed Jul. 30, 2020); the contents of all of which as are hereby incorporated by reference in their entirety.

BACKGROUND

Technical Field

The present invention relates to an estimation device and an estimation method.

Description of Related Art

In recent years, energy storage elements such as a lithium ion battery have been used in a wide range of fields such as a power source for a portable terminal such as a notebook personal computer and a smartphone, a renewable energy storage system, and an IoT device power source.

In operation of a battery including the energy storage element, a temperature of the energy storage element is required to be monitored. As a technique of monitoring the temperature of the energy storage device, for example, Patent Document JP-A-2009-99375 discloses a technique of dividing a battery cell into a plurality of cell blocks and estimating the temperature of the cell block at a temperature unmeasured position based on the temperature of the cell block at a temperature measurement position where the temperature is measured and a heat generation value in each cell block.

BRIEF SUMMARY

However, Patent Document JP-A-2009-99375 does not disclose a calibration method when a temperature estimated by simulation is different from a temperature measured by a sensor, and it is difficult to determine whether accurate temperature estimation is possible. Furthermore, when the method disclosed in Patent Document JP-A-2009-99375 is applied to an energy storage device including a plurality of energy storage elements, it is necessary to provide temperature detection means is required to be provided for each energy storage element in order to detect the temperature of each energy storage element, which causes an increase in manufacturing cost.

The present invention has been made in view of such circumstances, and an object of the present invention is to provide an estimation device and an estimation method capable of estimating a detailed temperature distribution while feeding back a temperature measured by a temperature sensor.

According to one aspect of the present invention, an estimation device includes: an acquisition unit that acquires a measurement result from a temperature sensor that measures a temperature at a specific position to which heat generated from an energy storage device is transferred; and an observer that estimates a temperature at a position where the temperature sensor does not measure a temperature in response to input of the measurement result.

According to another aspect of the present invention, an estimation method includes: acquiring a measurement result from a temperature sensor that measures a temperature at a specific position to which heat generated from an energy storage device is transferred; and estimating a temperature at a position where the temperature sensor does not measure a temperature by inputting the measurement result to an observer that estimates a state variable based on a state equation simulating heat conduction in the energy storage device and an observation equation expressing a relationship between the state variable in the state equation and an observation variable observable by the temperature sensor.

According to the present application, the detailed temperature distribution can be estimated while the temperature measured by the temperature sensor is fed back.

DETAILED DESCRIPTION OF VARIOUS EMBODIMENTS

Figure 1:
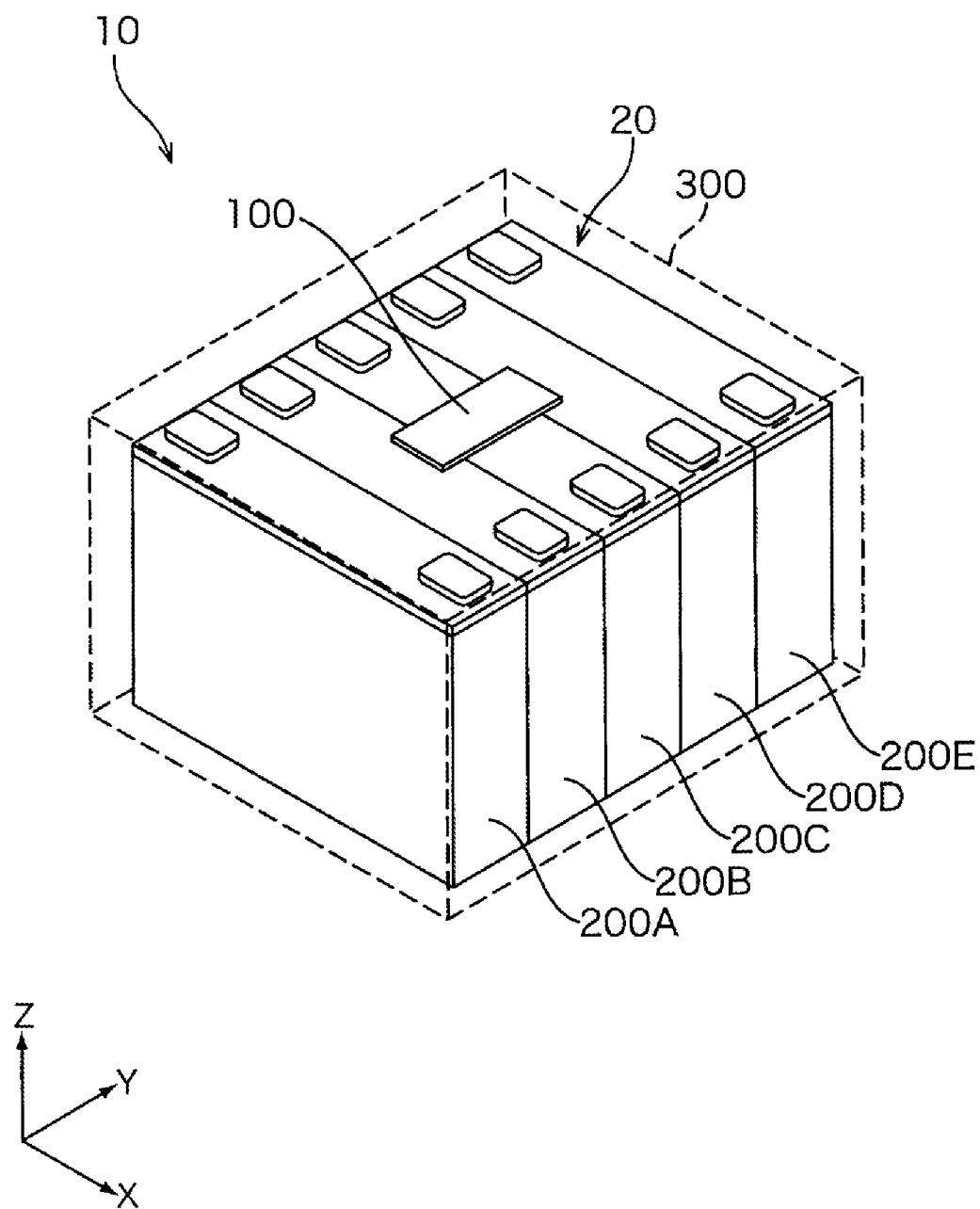
FIG. 1 is a schematic external view illustrating an energy storage system according to the present embodiment.

According to one aspect of the present invention, an estimation device includes: an acquisition unit that acquires a measurement result from a temperature sensor that measures a temperature at a specific position to which heat generated from an energy storage device is transferred; and an observer that estimates a temperature at a position where the temperature sensor does not measure a temperature in response to input of the measurement result.

According to this configuration, the temperature of the position where the temperature sensor does not measure a temperature can be estimated while the temperature of the position measured by the temperature sensor is fed back.

In the estimation device, the observer may estimate a temperature at a position where the temperature sensor does not measure a temperature by deriving a state variable based on a state equation simulating heat conduction in the energy storage device and an observation equation expressing a relationship between the state variable in the state equation and an observation variable observable by the temperature sensor. According to this configuration, the temperature at the position where the temperature sensor does not measure a temperature can be estimated through the state variable obtained from the observer.

In the estimation device, the observer may include an internal parameter designed in such a manner that an estimated temperature by the observer and a measured temperature by the temperature sensor asymptotically approach each other. According to this configuration, the observer can be constructed such that the estimated temperature by the observer and the measured temperature by the temperature sensor are substantially the same.

In the estimation device, the temperature sensor may be provided in the energy storage device, and the observer may estimate a temperature outside the energy storage device based on a temperature of the energy storage device measured by the temperature sensor. According to this configuration, the temperature outside the energy storage device can be estimated based on the temperature of the energy storage device.

In the estimation device, the observer may formulate an observer gain with a Kalman filter so as to provide a robust estimation function even when disturbance exists due to heat transfer between the energy storage device and an ambient environment. According to this configuration, even when a system noise and an observation noise are included, the observer gain of the disturbance observer using the Kalman filter is appropriately evaluated, so that the temperature estimation can be performed while influences of the system noise and the observation noise are prevented.

The estimation device may be configured as a server device disposed separately from the energy storage device. According to this configuration, in the server device installed at a place distant from the energy storage device, the temperature of the position where the temperature sensor does not measure a temperature can be estimated. Therefore, even when a large energy storage device or a large-scale energy storage device including a plurality of energy storage elements becomes a calculation target, the calculation can be performed at high speed.

The estimation device may further include an arithmetic unit that simulates a degradation prediction of the energy storage device using the temperature estimated by the observer. According to this configuration, the accuracy of the degradation prediction can be improved by more accurately estimating the temperature of the unmeasured position.

In the estimation, the simulation of the degradation prediction of the energy storage device may be simulation based on a physical model of the energy storage device. According to this configuration, the degradation of the energy storage device can be simulated by properly reflecting the physical phenomenon inside the energy storage device.

According to another aspect of the present invention, an estimation method includes: acquiring a measurement result from a temperature sensor that measures a temperature at a specific position to which heat generated from an energy storage device is transferred; and estimating a temperature at a position where the temperature sensor does not measure a temperature by inputting the measurement result to an observer that estimates a state variable based on a state equation simulating heat conduction in the energy storage device and an observation equation expressing a relationship between the state variable in the state equation and an observation variable observable by the temperature sensor.

According to this configuration, the temperature of the position where the temperature sensor does not measure a temperature can be estimated while the temperature of the position measured by the temperature sensor is fed back.

Hereinafter, the present invention will be specifically described based on the drawings illustrating embodiments.

First Embodiment

FIG. 1 is a schematic external view illustrating an energy storage system 10 according to a first embodiment. The energy storage system 10 of the first embodiment includes an estimation device 100, energy storage elements 200A to 200E, and an accommodation case 300 that accommodates the estimation device 100 and the energy storage elements 200A to 200E. In the first embodiment, the energy storage elements 200A to 200E constitute an energy storage device 20. In the following description, the energy storage elements 200A to 200E are also simply referred to as an energy storage element 200 in a case where it is not necessary to distinguish the energy storage elements 200A to 200E from each other.

For example, the estimation device 100 is a flat plate circuit board that is disposed on upper surfaces of a plurality of energy storage elements 200 and on which a circuit estimating a temperature of the energy storage element 200 at a predetermined point of time is mounted. Specifically, the estimation device 100 is connected to all the energy storage elements 200, acquires information from each energy storage element 200, and estimates the temperature of each energy storage element 200 at the predetermined point of time.

A place where the estimation device 100 is disposed is not limited to the upper surface of the energy storage element 200. Alternatively, the estimation device 100 may be disposed on a side surface of the energy storage element 200 or a lower surface of the energy storage element 200. A shape of the estimation device 100 is also not particularly limited. Furthermore, the estimation device 100 may be a server device located away from the energy storage element 200, and be configured to acquire information of sensors (sensors 103A to 103D in FIG. 3) by communication. Many of the expressions described in the present specification are simple, and an inexpensive arithmetic processing device is sufficiently used when the energy storage element is the small-sized energy storage element 200 as exemplified in the example. When a larger energy storage element is a calculation target or a large-scale energy storage device including a plurality of energy storage elements, a calculation load increases and a calculation processing speed decreases. In such a case, sometimes high-speed processing can be performed when a sensor acquired value is transferred to a server device at a place distant from the energy storage device by communication to perform arithmetic processing in the server device.

For example, the energy storage element 200 is a secondary battery such as a lithium ion secondary battery. The energy storage element 200 is applied to an automobile power source for an electric vehicle (EV), a hybrid electric vehicle (HEV), or a plug-in hybrid electric vehicle (PHEV), an electronic equipment power source, an energy storage power source, and the like. In FIG. 1, five rectangular energy storage elements 200 are arranged in series to form an assembled battery.

A number of energy storage elements 200 is not limited to five. For example, the number of the energy storage elements 200 may be one or two or more. Furthermore, some energy storage elements 200 may be connected in parallel. The energy storage element 200 may be a secondary battery other than the lithium ion secondary battery. Furthermore, not only the secondary battery but also any device having a heat generator (for example, a power module, a primary battery, a fuel cell, an electronic substrate, and a power distribution board) can establish the same principle.

Hereinafter, the configuration of the energy storage element 200 will be described in detail on the assumption that the energy storage element 200 is a liquid lithium ion battery.

Figure 2:
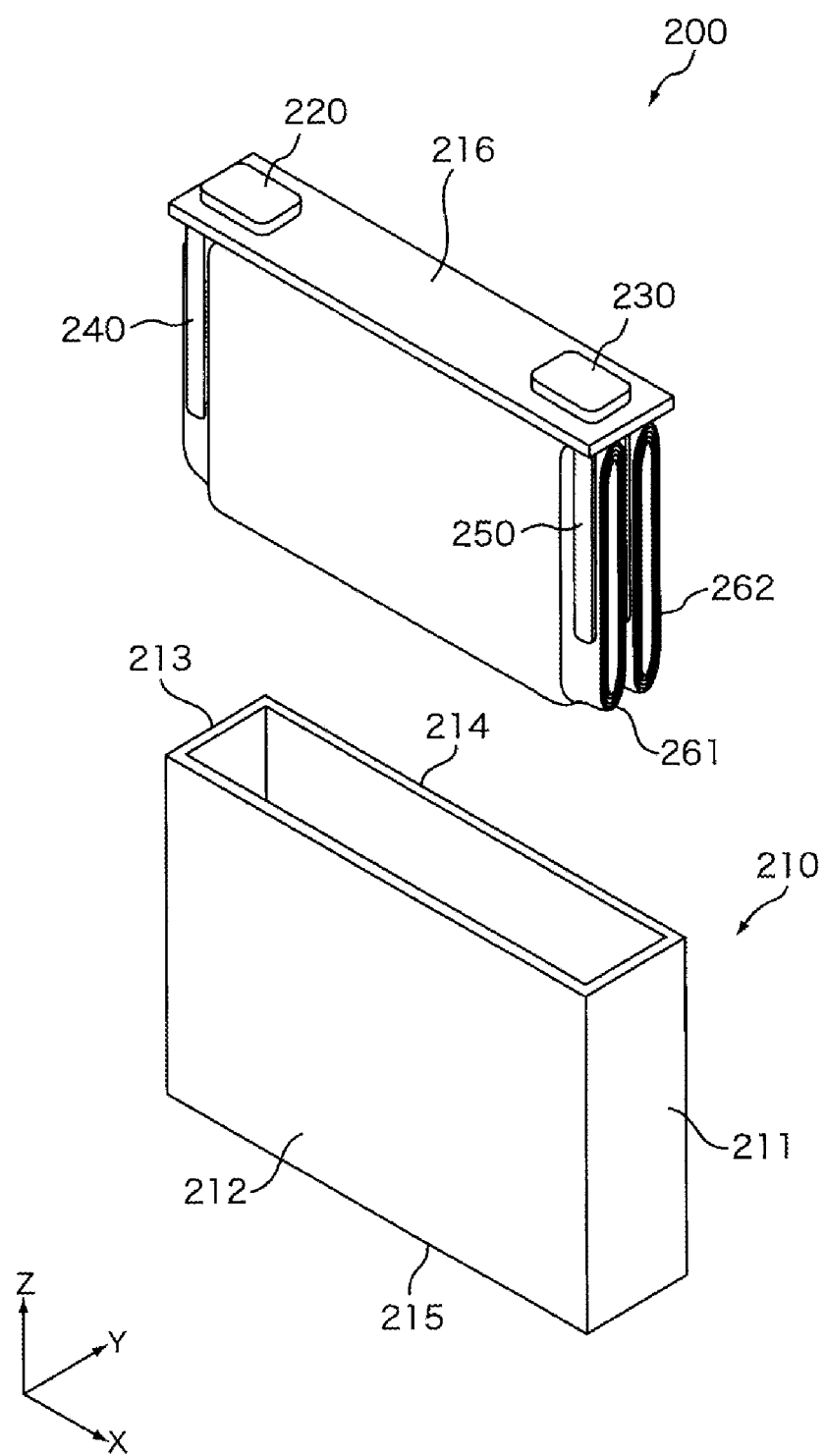
FIG. 2 is a perspective view illustrating a configuration of an energy storage element.

FIG. 2 is a perspective view illustrating the configuration of the energy storage element 200. Specifically, FIG. 2 illustrates a configuration where a main body of a case 210 is separated from the energy storage element 200.

As illustrated in FIG. 2, the energy storage element 200 includes the case 210, a positive electrode terminal 220, and a negative electrode terminal 230. A positive electrode current collector 240, a negative electrode current collector 250, and two electrode assemblies 261, 262 are accommodated in the case 210.

In addition to the above components, a spacer disposed inside the case 210, a gasket disposed around the terminal, a gas release valve releasing pressure when the pressure in the case 210 increases, an insulating film enclosing the electrode assemblies 261, 262, and the like may be disposed. Although an electrolyte solution is sealed in the case 210, the illustration is omitted. A kind of the electrolyte solution is not particularly limited as long as performance of the energy storage element 200 is not impaired, and various kinds of electrolyte solutions can be selected. A solid (for example, an ion conductive polymer or an ion conductive ceramic) exhibiting ion conductivity instead of the electrolyte solution in the liquid lithium ion battery may be used as an example of the different energy storage element 200.

The case 210 is a box-shaped member including plate-shaped side walls 211 to 214 and a bottom wall 215 that constitute a case main body and a plate-shaped lid body 216 that closes an opening of the case main body. For example, weldable metal such as stainless steel, aluminum, or an aluminum alloy or resin can be used as a material of the case 210.

The electrode assemblies 261, 262 are two energy storage elements (power generation elements) that include a positive electrode plate, a negative electrode plate, and a separator and can store electricity. That is, the two electrode assemblies of the electrode assembly 261 and the electrode assembly 262 are arranged in the Y-axis direction in FIG. 2.

For example, the positive electrode plates included in the electrode assemblies 261, 262 are obtained by forming a positive active material layer on a positive substrate layer that is plate-like, elongated current collecting foil made of aluminum, an aluminum alloy or the like. The negative electrode plate is obtained by forming a negative active material layer on a negative electrode substrate layer that is strip-shaped, elongated current collecting foil made of copper, a copper alloy or the like. For example, a microporous sheet made of a resin or a nonwoven fabric can be used as the separator. A known material such as nickel, iron, stainless steel, titanium, baked carbon, a conductive polymer, conductive glass, or an Al—Cd alloy may be appropriately used as the current collecting foil.

The electrode assemblies 261, 262 are formed by laminating plates. That is, the electrode assemblies 261, 262 are formed by winding the positive electrode plate and the negative electrode plate that are arranged in a layered manner such that the separator is sandwiched between the positive electrode plate and the negative electrode plate. Specifically, in the electrode assemblies 261, 262, the positive electrode plate and the negative electrode plate are wound with the separator interposed therebetween so as to be shifted from each other in a direction of a winding axis (virtual axis parallel to the X-axis in FIG. 2). On the outermost periphery of each of the electrode assemblies 261, 262, only the separator with neither the positive electrode plate nor the negative electrode plate interposed therebetween is wound around 1 to 2 turns while overlapped in a double manner to ensure insulation. In the first embodiment, an oval shape is illustrated as a sectional shape of the electrode assemblies 261, 262. Alternatively, the sectional shape of the electrode assemblies 261, 262 may be an elliptical shape or the like.

A known material can be appropriately used as long as the positive active material can store and release the lithium ion as the positive active material used for the positive active material layer. For example, a polyanion compound such as $LiMPO_4$, $LiMSiO_4$, or $LiMBO_3$ (M represents one or two or more transition metal elements selected from Fe, Ni, Mn, Co, and the like), a spinel-type lithium-manganese oxide such as $LiMn_2O_4$ or $LiMn_{1.5}Ni_{0.5}O_4$, a lithium transition metal oxide such as $LiMO_2$ (M includes one or two or more metal elements selected from Fe, Ni, Mn, Co, and the like, and a lithium excess-type composite oxide), or the like can be used as the positive active material.

A known material can be appropriately used as long as the negative active material can store and release the lithium ion as the negative active material used for the negative active material layer. For example, in addition to a lithium metal and a lithium alloy (lithium metal-containing alloys such as lithium-silicon, lithium-aluminum, lithium-lead, lithium-tin, lithium-aluminum-tin, lithium-gallium, and Wood's alloy), an alloy capable of storing and releasing lithium, a carbon material (for example, graphite, non-graphitizable carbon, graphitizable carbon, low-temperature calcined carbon, and amorphous carbon), a silicon oxide, a metal oxide, a lithium metal oxide ($Li_4Ti_5O_{12}$ or the like), a polyphosphoric acid compound, and a compound of a transition metal and a group 14 element to a group 16 element, such as $Co_3O_4$ or $Fe_2P$, which is generally called a conversion negative electrode can be cited as the negative active material.

The positive electrode terminal 220 is an electrode terminal electrically connected to the positive electrode plate of the electrode assembly 261, 262, and the negative electrode terminal 230 is an electrode terminal electrically connected to the negative electrode plate of the electrode assembly 261, 262. The positive electrode terminal 220 and the negative electrode terminal 230 are provided in the lid body 216. For example, the positive electrode terminal 220 and the negative electrode terminal 230 are made of aluminum or an aluminum alloy.

The positive electrode current collector 240 is a member that is electrically connected (joined) to the positive electrode terminal 220 and the positive electrode plate of the electrode assembly 261, 262, and has conductivity and rigidity. The negative electrode current collector 250 is a member that is electrically connected (joined) to the negative electrode terminal 230 and the negative electrode plate of the electrode assembly 261, 262, and has conductivity and rigidity. The positive electrode current collector 240 and the negative electrode current collector 250 are fixed to the lid body 216. Similarly to the positive electrode substrate layer, the positive electrode current collector 240 is made of aluminum, an aluminum alloy, or the like. Similarly to the negative electrode substrate layer, the negative electrode current collector 250 is made of copper, a copper alloy, or the like.

A configuration of the estimation device 100 will be described below.

Figure 3:
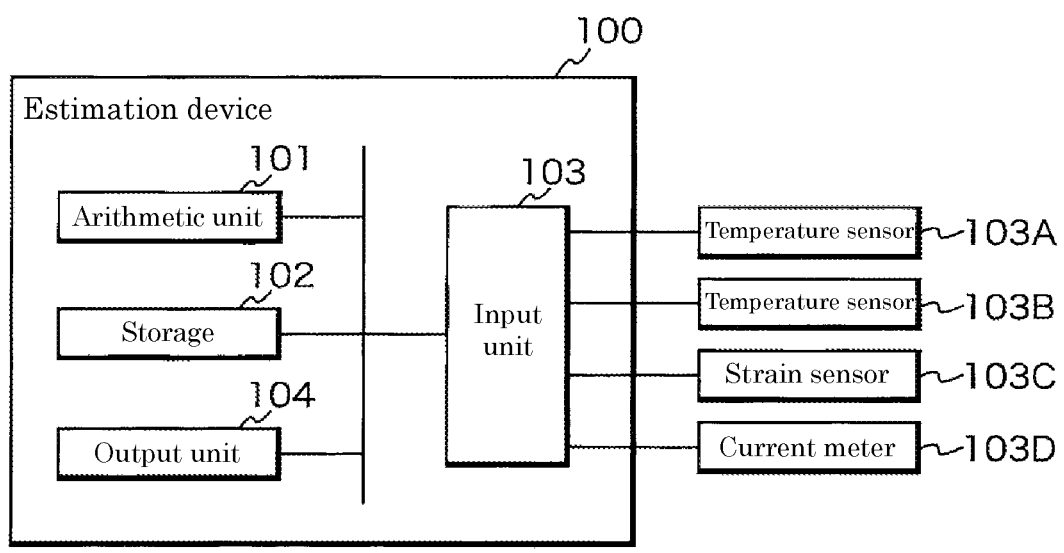
FIG. 3 is a block diagram illustrating an internal configuration of an estimation device.

FIG. 3 is a block diagram illustrating an internal configuration of the estimation device 100. The estimation device 100 includes an arithmetic unit (estimation unit) 101, a storage 102, an input unit 103, and an output unit 104.

The arithmetic unit 101 is an arbitrary arithmetic circuit including a microcomputer, a volatile or nonvolatile memory, and the like. The microcomputer controls the operation of each part of hardware according to a computer program stored previously in the memory, and causes the entire device to function as the estimation device of the present application. Specifically, the arithmetic unit 101 performs arithmetic calculation estimating the temperature of each energy storage element 200 based on a heat balance model of each energy storage element 200 expressed using an element temperature and an environmental temperature. At this point, the element temperature indicates a temperature of the energy storage element 200 measured by a temperature sensor 103A described later. The environmental temperature indicates an outside temperature (that is, a temperature of a space in which the energy storage device 20 is disposed) of the energy storage device 20. A method for estimating the temperature of each energy storage element 200 without measuring the environmental temperature in the second embodiment will be described later.

In the first embodiment, the arithmetic unit 101 is an arbitrary arithmetic circuit including a microcomputer, a volatile or nonvolatile memory, and the like. Alternatively, the arithmetic unit 101 may include a central processing unit (CPU), a read only memory (ROM), a random access memory (RAM), and the like.

The storage 102 is a storage device such as a flash memory. The storage 102 stores data required for arithmetic calculation of temperature estimation of each energy storage element 200. For example, the storage 102 includes data such as a volume, a surface area, specific heat, and a density of each energy storage element 200, a value of thermal conductance between the energy storage elements 200 adjacent to each other, and a heat transfer coefficient to the outside.

The value of thermal conductance used for the arithmetic calculation of the temperature estimation may be changed due to expansion of the energy storage element 200. For this reason, the storage 102 may store a table indicating a relationship between a value of strain measured by a strain sensor 103C described later and a value of thermal conductance.

A value of a heat transfer coefficient used for the arithmetic calculation of the temperature estimation may be changed depending on a flow of air around the energy storage device 20. For this reason, the storage 102 may store a table indicating a relationship between a value of flow velocity measured by a current meter 103D described later and the value of the heat transfer coefficient. Alternatively, the arithmetic calculation calculating the heat transfer coefficient from a relational expression established among the Nusselt number, the Prandtl number, and the Reynolds number may be performed.

The input unit 103 includes an interface that connects various sensors. The sensor connected to the input unit 103 includes a temperature sensor 103A that measures the temperature (element temperature) of the energy storage element 200. The temperature sensor 103A is an existing sensor such as a thermocouple or a thermistor. In the first embodiment, the energy storage element 200 of a measurement target is a part (for example, the energy storage element 200E) of the five energy storage elements 200A to 200E included in the energy storage device 20. The number of energy storage elements 200 of the measurement target may be one or two to four. That is, when the number of the energy storage devices 20 is N (N is an integer of 2 or more), the number of the energy storage elements 200 of the measurement target is appropriately installed within a range of 1 to (N-1). For example, the temperature sensor 103A is disposed on the upper surface of the energy storage device 20. Alternatively, the temperature sensor 103A is disposed on a side surface or a lower surface of the energy storage device 20.

A temperature sensor 103B that measures the environmental temperature of the energy storage device 20 may be connected to the input unit 103. The temperature sensor 103B is an existing sensor such as a thermocouple or a thermistor. The temperature sensor 103B may be installed at an appropriate position of the energy storage device 20 or at an appropriate position in a periphery of the energy storage device 20. When the estimation device 100 includes a communication interface that communicates with an external device, the information about the environmental temperature may be acquired by communication instead of the configuration that acquires the information about the environmental temperature from the temperature sensor 103B.

A strain sensor 103C that detects magnitude of strain of the energy storage element 200 may be connected to the input unit 103. The strain sensor 103C is an existing sensor using a strain gauge type load cell or the like. The strain sensor 103C is provided for each of the energy storage elements 200.

The current meter 103D that measures a flow of air around the energy storage device 20 may be connected to the input unit 103. The current meter 103D is an existing measuring instrument such as a flow meter. The current meter 103D is installed at an appropriate position around the energy storage device 20.

The output unit 104 includes an interface that connects an external device. The output unit 104 outputs a temperature estimation result of each energy storage element 200 that is an arithmetic result of the arithmetic unit 101 to an external device. In one example, the external device connected to the output unit 104 is a management device that manages a state of the energy storage device 20 or a control device that controls operation of the energy storage device 20. Alternatively, the external device connected to the output unit 104 may be a control device for a mobile terminal or an electric vehicle that operates by power supplied from the energy storage device 20. The external device may calculate a state of charge (SOC), a state of health (SOH), and the like of the energy storage device based on the temperature estimation result of the estimation device 100. The external device may control the operation of the energy storage device 20 according to the temperature estimation result of the estimation device 100.

A content of the arithmetic processing executed by the estimation device 100 will be described below.

The estimation device 100 estimates the temperature of each of the energy storage elements 200A to 200E using a heat balance model in consideration of the element temperature measured for some energy storage elements 200 (for example, 200E) in the plurality of energy storage elements 200 (200A to 200E) constituting the energy storage device 20 and the environmental temperature of the energy storage device 20.

The heat balance model of each of the energy storage elements 200A to 200E is expressed by a heat transfer equation, and for example, the following Mathematical formula 1 is used.

[Mathematical formula 1]

$$\rho C_p V \frac{dT_1}{dt} = k_{12}(T_2 - T_1) + S_1 h_1(T_0 - T_1) + Q_1$$

$$\rho C_p V \frac{dT_2}{dt} = k_{12}(T_1 - T_2) + k_{32}(T_3 - T_2) + S_2 h_2(T_0 - T_2) + Q_2$$

$$\rho C_p V \frac{dT_3}{dt} = k_{23}(T_2 - T_3) + k_{34}(T_4 - T_3) + S_3 h_3(T_0 - T_3) + Q_3$$

$$\rho C_p V \frac{dT_4}{dt} = k_{34}(T_3 - T_4) + k_{45}(T_5 - T_4) + S_4 h_4(T_0 - T_4) + Q_4$$

$$\rho C_p V \frac{dT_5}{dt} = k_{45}(T_4 - T_5) + S_5 h_5(T_0 - T_5) + Q_5$$

Where $T_1$ to $T_5$, $S_1$ to $S_5$, $Q_1$ to $Q_5$, and $h_1$ to $h_5$ express temperatures (K), surface areas (m²), heat generation values (W), and heat transfer coefficients to the outside (W/m²/K) of the energy storage elements 200A to 200E. $k_{ij}$ expresses thermal conductance (W/K) between the ith energy storage element 200 (for example, the energy storage element 200A) and the jth energy storage element 200 (for example, the energy storage element 200B). $\rho$, $C_p$, V express density (kg/m³), specific heat (J/kg/K), and volume (m³) of the energy storage element 200. Alternatively, the density, the specific heat, and the volume value may be individually set for the energy storage elements 200A to 200E. $T_0$ expresses an environmental temperature (K). t expresses time (s).

A left side in Mathematical formula 1 expresses an amount of heat used to increase the temperature of the energy storage element 200. A term including thermal conductance $k_{ij}$ on a right side expresses thermal conduction based on a temperature difference between the adjacent energy storage elements 200, 200. A term including the heat transfer rates $h_1$ to $h_5$ on the right side represents heat dissipation from the energy storage element 200 to the outside, and has a negative value when the heat dissipation is generated. The term including $Q_1$ to $Q_5$ expresses heat generation of the energy storage device 20. The cause of the heat generation includes Joule heat due to energization, reaction heat, and the like.

The arithmetic unit 101 may perform the arithmetic calculation using a previously-set value as the value of the thermal conductance $k_{ij}$ in Mathematical formula 1, or perform the arithmetic calculation using a value changed according to strain of the energy storage element 200. In the latter case, the value of the thermal conductance corresponding to the strain of the energy storage element 200 may be read from a table defining a relationship between the strain of the energy storage element 200 and the thermal conductance.

The arithmetic unit 101 may perform the arithmetic calculation using a previously-set value as the values of the heat transfer coefficients $h_1$ to $h_5$ in Mathematical formula 1, or perform the arithmetic calculation using a value changed according to the flow velocity of a surrounding fluid. In the latter case, the value of the heat transfer coefficient corresponding to the flow velocity of the surrounding fluid may be read from a table defining the relationship between the flow velocity and the heat transfer coefficient.

The following Mathematical formula 2 is obtained by rewriting a time differentiation of the left side in Mathematical formula 1 by the time difference.

[Mathematical formula 2]

$$\frac{\rho C_p V \{T_1(k+1) - T_1(k)\}}{\Delta t} = -(k_{12} + S_1 h_1) T_1(k) + k_{12} T_2(k) + S_1 h_1 T_0 + Q_1$$

$$\frac{\rho C_p V \{T_2(k+1) - T_2(k)\}}{\Delta t} =$$

$$k_{12} T_1(k) - (k_{12} + k_{23} + S_2 h_2) T_2(k) + k_{23} T_3(k) + S_2 h_2 T_0 + Q_2$$

$$\frac{\rho C_p V \{T_3(k+1) - T_3(k)\}}{\Delta t} =$$

$$k_{23} T_2(k) - (k_{23} + k_{34} + S_3 h_3) T_3(k) + k_{34} T_4(k) + S_3 h_3 T_0 + Q_3$$

$$\frac{\rho C_p V \{T_4(k+1) - T_4(k)\}}{\Delta t} =$$

$$k_{34} T_3(k) - (k_{34} + k_{45} + S_4 h_4) T_4(k) + k_{45} T_5(k) + S_4 h_4 T_0 + Q_4$$

$$\frac{\rho C_p V \{T_5(k+1) - T_5(k)\}}{\Delta t} = k_{45} T_4(k) - (k_{45} + S_5 h_5) T_5(k) + S_5 h_5 T_0 + Q_5$$

Where k is a natural number and expresses a time step. At expresses a time pitch width (s) of the calculation.

The following Mathematical formula 3 is obtained by sorting Mathematical formula 2.

$T_1(k+1) = \{1-\alpha(k_{12}+S_1h_1)\}T_1(k)+\alpha k_{12}T_2(k)+\alpha(S_1h_1T_0+Q_1)$ $T_2(k+1) = \alpha k_{12}T_1(k)+\{1-\alpha(k_{12}+k_{23}+S_2h_2)\}T_2(K)+\alpha k_{23}T_3(k)+\alpha(S_2h_2T_0+Q_2)$ $T_3(k+1) = \alpha k_{23}T_2(k)+\{1-\alpha(k_{23}+k_{34}+S_3h_3)\}T_3(k)+\alpha k_{34}T_4(k)+\alpha(S_3h_3T_0+Q_3)$ $T_4(k+1) = \alpha k_{34}T_3(k)+\{1-\alpha(k_{34}+k_{45}+S_4h_4)\}T_4(k)\alpha k_{45}T_5(k)+\alpha(S_4h_4T_0+Q_4)$ $T_5(k+1) = \alpha k_{45}T_4(k)+\{1-\alpha(k_{45}+S_5h_5)\}T_5(k)+\alpha(S_5h_5T_0+Q_5)$ [Mathematical formula 3]

Where $\alpha = (\rho C_p V/\Delta t)^{-1}$.

Subsequently, in order to express Mathematical formula 3 as a matrix, a state vector x(k), a vector b, and a matrix A are defined by the following Mathematical formula 4.

[Mathematical formula 2]

$$x(k) = \begin{Bmatrix} T_1(k) \\ T_2(k) \\ T_3(k) \\ T_4(k) \\ T_5(k) \end{Bmatrix}, \quad b = \begin{Bmatrix} \alpha(S_1 h_1 T_0 + Q_1) \\ \alpha(S_2 h_2 T_0 + Q_2) \\ \alpha(S_3 h_3 T_0 + Q_3) \\ \alpha(S_4 h_4 T_0 + Q_4) \\ \alpha(S_5 h_5 T_0 + Q_5) \end{Bmatrix}$$

$$A = \begin{Bmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \\ a_{41} & a_{42} & a_{43} & a_{44} & a_{45} \\ a_{51} & a_{52} & a_{53} & a_{54} & a_{55} \end{Bmatrix}$$

Where $a_{11}=1-\alpha(k_{12}+S_1h_1)$, $a_{22}=1-\alpha(k_{12}+k_{23}+S_2h_2)$, $a_{33}=1-\alpha(k_{23}+k_{34}+S_3h_3)$, $a_{44}=1-\alpha(k_{34}+k_{45}+S_4h_4)$, and $a_{55}=1-\alpha(k_{45}\pm S_5h_5)$B7. In addition, $a_{12}=a_{21}=\alpha k_{12}$, $a_{23}=a_{32}=\alpha k_{23}$, $a_{34}=a_{43}=\alpha k_{34}$, $a_{45}=a_{54}=\alpha k_{45}$, and others are 0.

A discrete space state equation including the above state vector x(k) as the state variable is expressed as follows. At this point, u(k)=1 may be set.

$x(k+1)=Ax(k)+bu(k)$ [Mathematical formula 5]

An observation equation is expressed as Mathematical formula 6. T in the upper right represents transposition. More generally, a direct term is added to the right side, but in the case of heat transfer, a representative time is longer than an arithmetic time, and thus it may be ignored in many cases.

$$y(k) = C^T x(k) \qquad \text{[Mathematical formula 6]}$$

In the observation equation of Mathematical formula 6, a scalar observation value y(k) is used as tan observation variable. Alternatively, the observation value may be plural. Where C is an observation vector (or an observation matrix) having the element temperature measured by the temperature sensor 103A as a factor. For example, when only the temperature of the fifth energy storage element 200 is measured, the observation vector is expressed as the following Mathematical formula 7.

$$C = \begin{Bmatrix} 0 \\ 0 \\ 0 \\ 0 \\ 1 \end{Bmatrix} \qquad \text{[Mathematical formula 7]}$$

Mathematical formula 5 is a state equation simulating the heat conduction in the energy storage device 20, and Mathematical formula 6 is an observation equation representing a relationship between the state variable in the state equation and the observation variable observable by the temperature sensor 103A.

In the first embodiment, the temperature estimation is performed using an observer corresponding to an actual system expressed by the state equation of Mathematical formula 5 and the observation equation of Mathematical formula 6.

Figure 4:
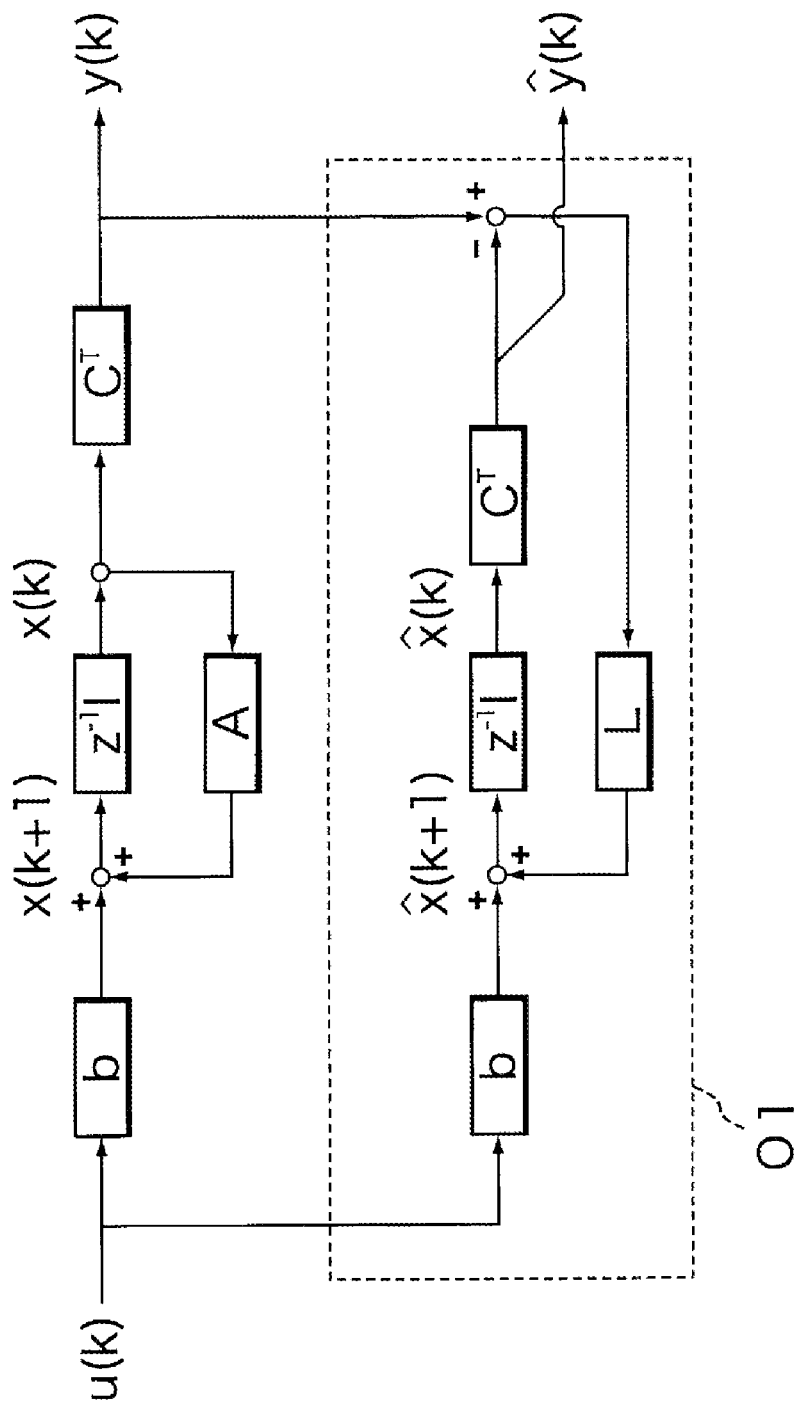
FIG. 4 is a state variable diagram including an observer.

FIG. 4 is a state variable diagram including the observer. An observer O1 corresponding to the actual system expressed by the state equation of Mathematical formula 5 and the observation equation of Mathematical formula 6 is expressed by the discrete space state equation in Mathematical formula 8 and the observation equation in Mathematical formula 9. In FIG. 4, $z^{-1}$ expresses a delay device by z conversion, and I expresses a unit matrix.

$$\hat{x}(k+1) = A\hat{x}(k)bu(k) \qquad \text{[Mathematical formula 8]}$$

$$\hat{y}(k) = C^T \hat{x}(k) \qquad \text{[Mathematical formula 9]}$$

In the actual system and the observer O1, the parameters A, b, c and the control input u(k) are the same, and the state variables and the observation variables are different. When there is a difference between a state variable x(k) in the actual system and a state variable x#hat(k) of the observer O1, it expresses that there is a difference between an actual measurement and a simulation model. Accordingly, a behavior of the observer O1 is corrected using feedback. A feedback gain (observer gain) is set to L. L is a vertical vector having the same dimension as x(k). The discrete space state equation to which the observer gain is added is expressed by the following Mathematical formula 10.

[Mathematical formula 10]
$$\hat{x}(k+1) = A\hat{x}(k) + bu(k) + L\{y(k) - \hat{y}(k)\}$$
$$= A\hat{x}(k) + bu(k) + L\{y(k) - C^T \hat{x}(k)\}$$
$$= (A - LC^T)\hat{x}(k) + Ly(k) + bu(k)$$

At this point, the difference between the observation variables of the real system and the observer O1 in the (k+1) step is expressed as follows.

[Mathematical formula 11]
$$\hat{x}(k+1) - x(k+1) = (A - LC^T)\hat{x}(k) + Ly(k) + bu(k) -$$
$$\{Ax(k) + bu(k)\}$$
$$= (A - LC^T)\hat{x}(k) + LC^T x(k) - Ax(k)$$
$$= (A - LC^T)\{\hat{x}(k) - x(k)\}$$

At this point, x#hat(k+1)−x(k+1) and x#hat(k)−x(k) express the difference between the real system and the observer O1. However, when all real parts of the eigenvalues of the matrix (A-LC$^T$) are negative, it is known that the error asymptotically approaches zero. That is, the state variable x#hat(k) obtained from the observer O1 can be matched with the state variable x(k) in the actual system using the observer O1 in which the observer gain is designed such that all the real parts of the eigenvalues of the matrix (A-LC) are negative. The state variable x(k) in the actual system represents the temperature at each of the energy storage elements 200A to 200E as illustrated in Mathematical formula 4, so that the temperature (for example, temperatures on the energy storage elements 200A to 200D) of the position not measured by the temperature sensor 103A can be estimated through the state variable x#hat(k) of the observer O1.

Estimation processing executed by the estimation device 100 will be described below.

Figure 5:
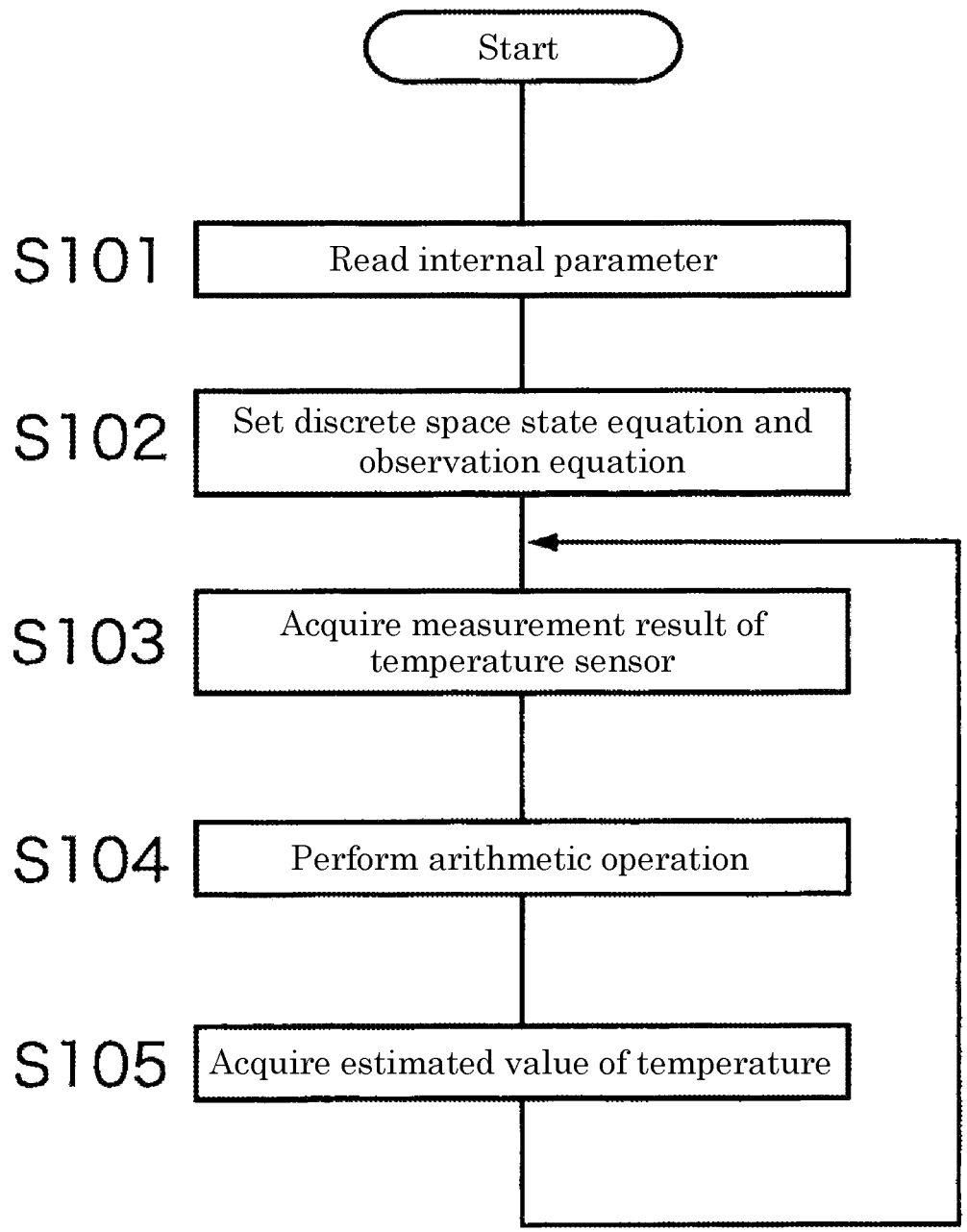
FIG. 5 is a flowchart illustrating a processing procedure of estimation processing executed by the estimation device.

FIG. 5 is a flowchart illustrating a processing procedure of the estimation processing executed by the estimation device 100. The arithmetic unit 101 of the estimation device 100 reads numerical values such as a physical property value and a boundary condition from the storage 102 (step S101), and sets the discrete space state equation and the observation equation that indicate the actual system and the discrete space state equation and the observation equation that indicate the observer O1 (step S102).

Subsequently, the arithmetic unit 101 acquires a measurement result of the temperature sensor 103A through the input unit 103 (step S103).

The arithmetic unit 101 executes the arithmetic calculation based on the acquired measurement result, the discrete equation and the observation equation indicating the set actual system, and the discrete equation and the observation equation indicating the observer O1 (step S104), and acquires an estimated value of the temperature through the state variable x#hat(x) included in the state equation of the observer O1 (step S105). The temperature that is not measured, that is, the potential state variable can be estimated by repeatedly executing these measurement and calculation processing in real time at the same time as the actual machine operates.

As described above, in the first embodiment, the temperatures of other positions (for example, the energy storage elements 200A to 200D) can be estimated while the difference between the temperature measured at the specific position (for example, the energy storage element 200E) to which the heat generated from the energy storage device 20 is transferred and the estimated temperature at the specific position is fed back using the observer O1.

In the first embodiment, the temperatures of the energy storage elements 200A to 200D are estimated based on the temperature measured for the energy storage element 200E and heat absorbing and heat generation values. The heat absorbing and heat generation values may include not only the amount of heat absorbed and generated by the electrode portion, but also the heat generation value of a member (although not illustrated in FIG. 1, for example, an electrical connection member such as a bus bar that connects the positive electrode terminal 220 of the energy storage element 200A and the negative electrode terminal 230 of the energy storage element 200B to each other) that electrically connects the energy storage elements.

In the first embodiment, an example in which all the state variables x(k) are estimated with only one observation value of the scalar observation value y(k) has been described. Alternatively, even when there are a plurality of observation values, all the state variables can be estimated by a similar calculation technique. Furthermore, although the state vector x(k) has been described as one state quantity for one energy storage device, a three-dimensional temperature distribution may be considered by dividing the energy storage device into a plurality of regions, or the temperature estimation can be performed by exactly the same logic even when a temperature of an electric connection member such as the positive electrode terminal, the negative electrode terminal, or the bus bar is included in the state vector x(k).

Second Embodiment

A configuration in which the temperature estimation is performed in consideration of heat exchange between the energy storage device 20 and the ambient environment will be described in a second embodiment.

An overall configuration of the system and the internal configurations of the energy storage device 20 and the estimation device 100 are similar to those of the first embodiment, and the description thereof will be omitted.

A heat conduction equation of the energy storage device 20 is expressed as follows.

$$\rho C_p V \frac{dT}{dt} = hS(T_0 - T) + Q \qquad \text{[Mathematical formula 12]}$$

Where $\rho$, $C_p$, V express density (kg/m$^3$), specific heat (J/kg/K), and volume (m$^3$) of the energy storage device 20. T expresses the temperature (K) of the energy storage device 20, and $T_0$ expresses the temperature of the ambient environment. t expresses time (s), h expresses a heat transfer coefficient (W/m$^2$/K) of a path from the energy storage device 20 to the ambient environment, S expresses the surface area (m$^2$) of the energy storage device 20, and Q expresses the heat generation value (W) of the energy storage device 20.

In the second embodiment, the heat conduction equation for the energy storage device 20 is illustrated for simplification. Alternatively, similarly to the first embodiment, the heat conduction equation may be described for each of the energy storage elements 200A to 200E constituting the energy storage device 20.

When the Mathematical formula 12 is transformed, Mathematical formula 13 is obtained. Where, T is the temperature of the energy storage device 20, and for example, is the temperature measured by the temperature sensor 103A. The second term on the right side expresses endothermic and exothermic heat due to Joule heat generation and electrochemical reaction heat, and is a value that can be calculated using internal resistance, reaction heat, an electric conduction amount, and the like. That is, the second term on the right side can be treated as a known value. The third term on the right side is a term expressing the influence of the temperature of the ambient environment, and is an unknown value. The third term on the right side includes not only heat dissipation from the energy storage device 20 to the outside, but also heat conduction from the accommodation case 300 and the like.

$$\frac{dT}{dt} = -\frac{hS}{\rho C_p V}T + \frac{Q}{\rho C_p V} + \frac{hST_0}{\rho C_p V} \qquad \text{[Mathematical formula 13]}$$

In the second embodiment, the state equation is described with the second term on the right side of Mathematical formula 13 as a control input and the third term as a disturbance. When Mathematical formula 13 is simplified, it is expressed as Mathematical formula 14.

$$\dot{T} = AT + Bu + Dd \qquad \text{[Mathematical formula 14]}$$

Where $A = -hS/\rho C_p V$, $B = 1/\rho C_p V$, $D = hS/\rho C_p V$, $u = Q$, and $d = T_0$. In Mathematical formula 14, u expresses the control input, and d expresses the disturbance. B and u, and D and d can be arbitrarily set. In Mathematical formula 14, A, B, D are scalars, but can also be described as vectors.

A fluctuation speed of the disturbance is sufficiently slow as compared to the speed of the calculation processing, particularly in the case of a thermal problem. For this reason, a first-order time differentiation of the disturbance may be set to zero.

The observation equation is represented by Mathematical formula 15.

$$y = C^T T \qquad \text{[Mathematical formula 15]}$$

At this point, y expresses an observation value, and C expresses an observation matrix, but y and C are treated as scalars for the time being.

When the state vector x is defined by Mathematical formula 16, the state equation is expressed as Mathematical formula 17.

$$\vec{x} = \begin{pmatrix} T \\ d \end{pmatrix} \qquad \text{[Mathematical formula 16]}$$

$$\dot{\vec{x}} = \begin{pmatrix} A & D \\ 0 & 1 \end{pmatrix}\vec{x} + \begin{pmatrix} B \\ 0 \end{pmatrix}u \qquad \text{[Mathematical formula 17]}$$

In addition, the temperature T of the energy storage device 20 is measured by the temperature sensor 103A, but the temperature $T_0$ of the ambient environment is not measured, so that the observation equation of Mathematical formula 15 is rewritten into the following format of Mathematical formula 18 using the state vector x.

$$y = (c\,0)\vec{x} \qquad \text{[Mathematical formula 18]}$$

When each component of Mathematical formula 17 is discretized, it is expressed as Mathematical formula 19.

$$T(k+1) - T(k) = \{AT(k) + Bu(k) + Dd(k)\}\Delta t \quad d(k+1) = d(k) \qquad \text{[Mathematical formula 19]}$$

When Mathematical formula 19 is collectively described, it is expressed as Mathematical formula 20.

$$\begin{pmatrix} T(k+1) \\ d(k+1) \end{pmatrix} = \begin{pmatrix} A_e & D_e \\ 0 & 1 \end{pmatrix} \begin{pmatrix} T(k) \\ d(k) \end{pmatrix} + \begin{pmatrix} B_e \\ 0 \end{pmatrix} u(k)$$

[Mathematical formula 20]

At this point, $A_e=1-A\Delta t$, $D_e=D\Delta t$, and $B_e=B\Delta t$.

Similarly, when Mathematical formula 18 is discretized, it is expressed as Mathematical formula 21.

$$y(k) = C_e \begin{pmatrix} T(k) \\ d(k) \end{pmatrix}$$

[Mathematical formula 21]

In the second embodiment, the temperature estimation is performed using the observer corresponding to the actual system expressed by the state equation of Mathematical formula 20 and the observation equation in FIG. 21.

Figure 6:
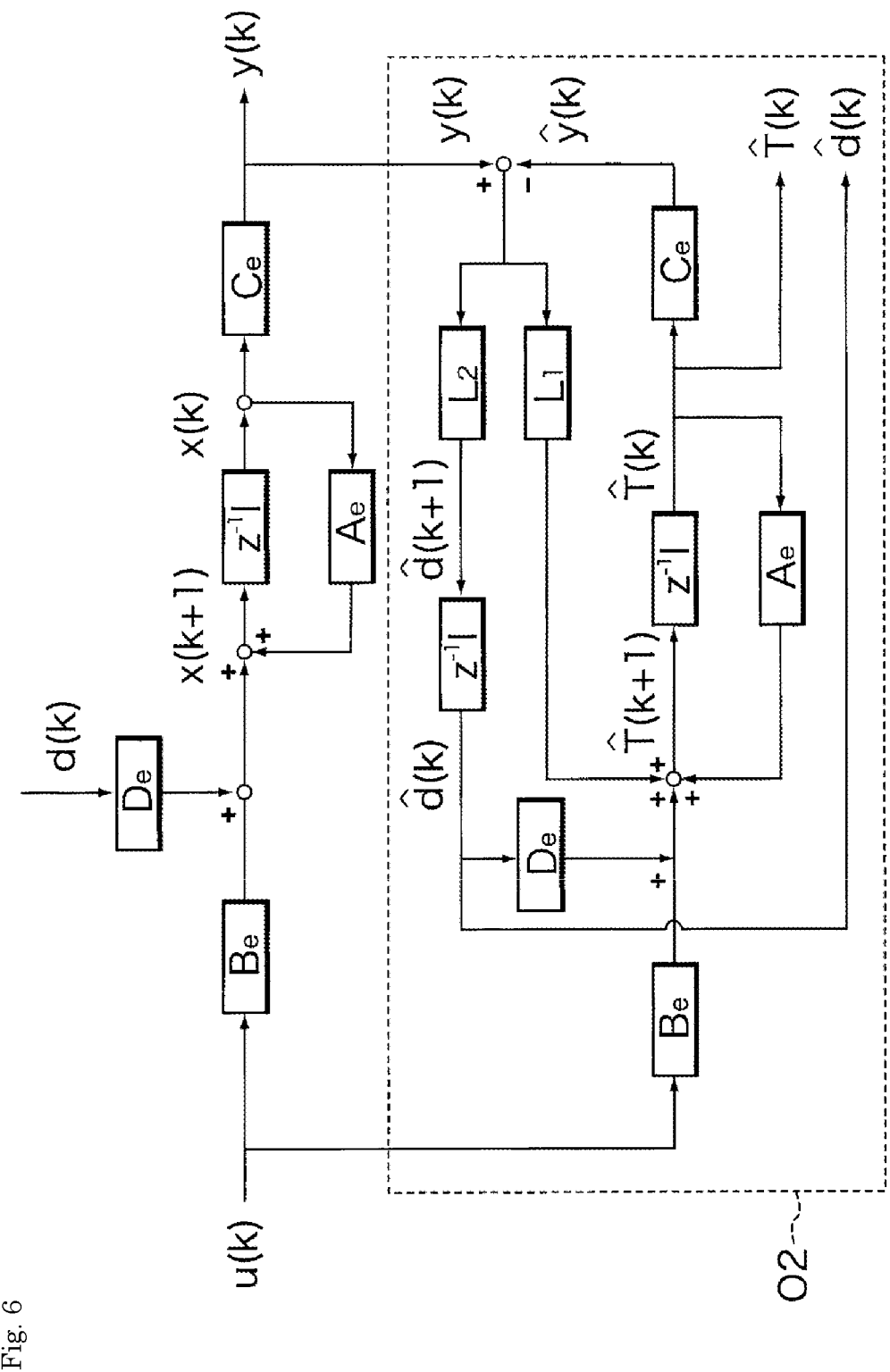
FIG. 6 is a state variable diagram including a disturbance observer.

FIG. 6 is a state variable diagram including a disturbance observer. When it is assumed that the systems expressed by Mathematical formula 20 and Mathematical formula 21 are observable, the state equation and the observation equation of a disturbance observer O2 are expressed as Mathematical formula 22 and Mathematical formula 23.

$\hat{x}(k+1)=A_e\hat{x}(k)+B_e u(k)+L_e\{\hat{y}(k)-y(k)\}$ [Mathematical formula 22]

$\hat{y}(k)=C_e\hat{x}(k)$ [Mathematical formula 23]

Where x and y with a hat express the estimated value of the observer, and $L_e$ expresses the observer gain. The observer gain $L_e$ may be appropriately set such that the matrix $(A_e-L_e C_e)$ becomes an asymptotically stable matrix, namely, such that all the real parts of the eigenvalues of the matrix $(A_e-L_e C_e)$ become negative. The state variable T#hat (k) obtained from the disturbance observer O2 can be matched with the state variable x(k) in the actual system using the disturbance observer O2 in which the observer gain is designed such that all the real parts of the eigenvalues of the matrix $(A_e-L_e C_e)$ become negative. At this point, the estimation device 100 can estimate the temperature outside the energy storage device 20 through d#hat(k) obtained from the disturbance observer O2.

When the value of d that is a disturbance term indicates an abnormal value (indicates a large value), the estimation device 100 can estimate that the outside of the energy storage device 20 becomes a high temperature state. The estimation device 100 may compare the value of d obtained from the disturbance observer O2 with a previously-set threshold, and the output unit 104 may notify information indicating that the outside of the energy storage device 20 becomes a high temperature state when the value of d is higher than the threshold.

In the second embodiment, one disturbance in the energy storage device 20 is estimated by one observation value. Alternatively, any number of variables may be used. For example, the estimation device 100 may estimate q (q is an integer of 1 or more) disturbances using r (r is an integer of 1 or more) observation values in p (p is an integer of 1 or more) energy storage devices 20. For example, in the case of p=5, an equation similar to Mathematical formula 2 is used as the heat conduction equation of each energy storage device 20. In addition, a vertical vector of (p+q)×1 may be used as the state vector x in Mathematical formula 17, a matrix of p×p may be used as A, a unit matrix of q×q may be used instead of scalar 1, and a vertical vector of p×1 may be used as B. Furthermore, a vertical vector of r×1 may be used as y in Mathematical formula 18, and a matrix of r×p may be used as c.

The estimation device 100 may estimate a plurality of disturbances (the temperature outside the energy storage device 20), and map and display the estimated temperature outside the energy storage device 20 as a function of the position.

According to the method of the second embodiment, the temperature of the ambient environment can be estimated. Consequently, for example, the temperature sensor 103B that measures the temperature of the ambient environment can be omitted.

The estimation device 100 may determine the validity of the measurement value of the temperature sensor 103B by comparing the estimated temperature of the surrounding environment to the measurement value of the temperature sensor 103B. Normally, only one temperature sensor 103B that measures the temperature of the surrounding environment is provided for the energy storage system 10, but the entire outer surface of the energy storage system 10 does not necessarily have the same temperature. For this reason, when the measurement value of the temperature sensor 103B is an inappropriate value (for example, the temperature is measured in a lower temperature region than the surroundings), the calculation of the observer may calculate the temperature deviating from the actual state. The temperature can be estimated while verifying the validity of the temperature of the surrounding environment used for calculation of the observer is verified using the method of the second embodiment.

Third Embodiment

The temperature estimation when a system noise and an observation noise are included will be described in a third embodiment.

An overall configuration of the system and the internal configurations of the energy storage device 20 and the estimation device 100 are similar to those of the first embodiment, and the description thereof will be omitted. In the description of the third embodiment, the disturbance observer equation described in the second embodiment (that is, the equation in which the subscript character e is included in the parameter of the system) is used, but a similar theory is also established in the first embodiment by replacing $A_e$ with A and $C_e$ with C.

In the third embodiment, the influence of the noise is prevented using a Kalman filter. The discrete space state equation and the observation equation including the system noise w(k) and the observation noise v(k) are expressed by the following Mathematical formula 24 and Mathematical formula 25.

$x(k+1)=A_e x(k)+B_e u(k)+w(k)$ [Mathematical formula 24]

$y(k)=C_e(k)+v(k)$ [Mathematical formula 25]

Where the observer gain $L_e$ of the disturbance observer using the Kalman filter is expressed by the following Mathematical formula 26. In Mathematical formula 26, V expresses a covariance matrix of the system noise, and W expresses a covariance matrix of the observation noise.

$L_e=-PC_e^T V^{-1}$ [Mathematical formula 26]

The observer gain $L_e$ is derived through a Riccati equation based on a linear quadratic (LQ) control theory that minimizes an evaluation function expressed by a quadratic form.

The matrix P in Mathematical formula 26 is expressed as a solution satisfying the following Riccati equation.

$$A_e P A_e^T + P + P C_e^T (C_e P C_e^T + V)^{-1} C_e P = -W \quad \text{[Mathematical formula 27]}$$

As described above, in the third embodiment, even when the system noise and the observation noise are included, the observer gain $L_e$ of the disturbance observer using the Kalman filter is appropriately evaluated, so that the temperature estimation can be performed using the observer while the influence of the system noise and the observation noise are prevented.

Application examples of the temperature estimation will be described below.

Application Example 1

Figure 7:
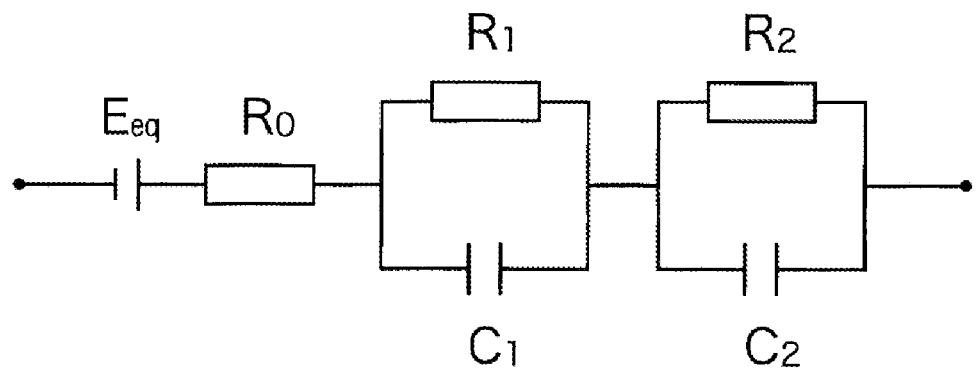
FIG. 7 is a circuit diagram illustrating an example of an equivalent circuit model.

An equivalent circuit model is well known as a mathematical model expressing an electrical characteristic of the energy storage element 200 represented by a lithium ion battery. FIG. 7 is a circuit diagram illustrating an example of the equivalent circuit model. The equivalent circuit model of the energy storage element 200 is often expressed by, for example, a combination of a resistor, a capacity component, and a voltage source as illustrated in FIG. 7.

In FIG. 7, $R_0$ is an ohmic resistance component, $R_1$ is a reaction resistance component of the positive electrode, $C_1$ is a capacity component of the positive electrode, $R_2$ is a reaction resistance component of the negative electrode, $C_2$ is a capacity component of the negative electrode, and $E_{eq}$ is an open circuit voltage (OCV). However, FIG. 7 is an example, and there is no limitation on a combination of series and parallel or the number and type of electric circuit components.

It is known that a charge-discharge characteristic of the energy storage element 200 represented by a lithium ion battery are strongly affected by the temperature and the SOC. The SOC is an abbreviation of a state of charge, and a full charge state is expressed as 100% and a full discharge state is expressed as 0%. The components of $R_0$ to $R_2$, $C_1$ to $C_2$, $E_{eq}$ are expressed as a two-variable function of the SOC and the temperature. A previously-acquired value may be used as the relationship between the values of $R_0$ to $R_2$, $C_1$ to $C_2$, $E_{eq}$ and the SOC and the temperature.

The energy storage system 10 may hold a mathematical model of the energy storage element 200 in addition to the estimation device 100. The mathematical model of the energy storage element 200 includes information about the open circuit potential and the internal impedance of the energy storage element 200, and indicates the relationship between the current and the voltage. The mathematical model of the energy storage element 200 is used for a state estimator (also referred to as an observer) and future prediction of the energy storage element 200.

The temperature of each energy storage element 200 can be precisely and accurately estimated using the estimation device 100, so that it can be expected that the characteristic value of each element of the equivalent circuit becomes more accurate and that the accuracy of the simulation of the charge-discharge characteristic is also improved.

Application Example 2

For example, a model disclosed in Non-Patent Document "Comparison of Modeling Predictions with Experimental Data from Plastic Lithium Ion Cells, M. Doyle, T. F. Fuller and J. Newman, Journal of The Electrochemical Society, 143 (6), 1890-1903 (1996)" may be used as a battery model other than the equivalent circuit. This model is a physical model of a battery (in particular, a lithium ion battery) what is called a Newman model.

The Newman model assumes a shape in which a plurality of active material particles having a uniform particle size constituting the positive and negative electrodes are arranged adjacent to each other. A solved amount is a potential (solid phase potential) of the active material particles, a potential (liquid phase potential) of the electrolyte solution, an ion concentration of the electrolyte solution, and molecular diffusion of the stored lithium ion in the active material of the positive and negative electrodes. These amounts are solved in association with each other in consideration of an equilibrium potential at a solid-liquid interface, an activation overvoltage determined by a Butler-Volmer equation, and stoichiometry. The Newman model is described by a Nernst-Planck equation, a charge conservation equation, a diffusion equation, the Butler-Volmer equation, and a Nernst equation described below.

The Nernst-Planck equation is an equation solving ion migration and ion diffusion in an electrolyte solution or a porous electrode, and is expressed by the following equation.

$$i_l = -\sigma_{l,\text{eff}} \nabla \phi_l + \frac{\sigma_{l,\text{eff}} RT}{F}\left(1 + \frac{\partial \ln f}{\partial \ln c_l}\right)(1-t_+)\nabla \ln c_l \quad \text{[Mathematical formula 28]}$$

$$\nabla \cdot i_l = i_{tot}$$

Where $\sigma_{l,\text{eff}}$ expresses a liquid phase conductivity (S/m), $\varphi l$ expresses a liquid phase potential (V), R expresses a gas constant (J/(K·mol)), T expresses a temperature (K), F expresses a Faraday constant (C/mol), f expresses an activity coefficient, $c_l$ expresses an ion concentration of the electrolyte (mol/m$^3$), $t_+$ expresses a cation transport number, and $i_{tot}$ expresses a reaction current density per volume. The liquid phase effective conductivity $\sigma_{l,\text{eff}}$ is apparent conductivity in a porous body, and is often expressed as a function of the conductivity of the liquid phase bulk and the solid phase volume ratio $\varepsilon_s$.

The charge conservation equation is an equation representing electron conduction in the porous electrode or the current collector, and is expressed by the following equations.

$$i_s = -\sigma_s \nabla \phi_s, \nabla \cdot i_s = -i_{tot} \quad \text{[Mathematical formula 29]}$$

Where $\varphi_s$ expresses a solid phase potential (V), $\sigma_s$ expresses a solid phase conductivity (S/m), and $i_{tot}$ expresses a reaction current density per volume (A/m$^3$). The solid phase refers to an electron conduction unit.

The diffusion equation is an equation expressing the diffusion of the stored lithium ion in the active material particle, and is expressed by the following equation.

$$\frac{\partial c_s}{\partial t} = \nabla \cdot (D_s \nabla c_s) \quad \text{[Mathematical formula 30]}$$

Where $c_s$ expresses a stored lithium ion concentration (mol/m$^3$) in the solid phase, t expresses time (s), and $D_s$ expresses a diffusion coefficient (m$^2$/s) in the stored lithium ion in the active material particle. $D_s$ may be a function of the stored lithium ion in the active material particles, an electrode composition, the state of charge (SOC), or the temperature.

The Butler-Volmer equation is an equation expressing an activation overvoltage in a charge transfer reaction generated at an interface between the active material particle and the electrolyte solution, and the Nernst equation is a definition formula of an equilibrium potential $E_{eq}$, and each is expressed by the following equations.

[Mathematical formula 31]

$$i_{loc} = i_0 \left[ \exp\left(\frac{\alpha_a nF\eta}{RT}\right) - \exp\left(-\frac{\alpha_c nF\eta}{RT}\right) \right]$$
$$\eta = \phi_s - \phi_l - E_{eq}$$
$$E_{eq} = E_0 + \frac{nF}{RT} \ln\left(\frac{a_O}{a_R}\right)$$

Where $i_{loc}$ is a reaction current density (A/m$^2$), $i_0$ is an exchange current density (A/m$^2$), $\alpha_a$, $\alpha_c$ are transition coefficients, $\eta$ is an activation overvoltage (V), $E_{eq}$ is an equilibrium potential (V), $E_0$ is a standard equilibrium potential (V), n is a the number of participation electrons, $a_O$ is an oxidizer concentration, and $a_R$ is a reducing agent concentration (mol/m$^3$).

The relational expression between the stored lithium ion concentration in the solid phase and the stored lithium ion flux regarding the charge transfer reaction on the surface of the active material particle is expressed in Mathematical formula 32. $r_0$ expresses a radius (m) of the active material particle, and $J_s$ expresses a flux (mol/m$^2$s) of the stored lithium ion. In other words, $J_s$ is the amount of stored lithium ion per unit area unit time that are disappeared and generated by the charge transfer reaction.

$$D_s \frac{\partial c_s}{\partial r}\bigg|_{r=r_0} = J_s \quad \text{[Mathematical formula 32]}$$

Mathematical formula 33 is an equation expressing the relationship between the flux $J_s$ of the stored lithium ion and the reaction current density $i_{loc}$.

$$i_{loc} = zFJ_s \quad \text{[Mathematical formula 33]}$$

Mathematical formula 34 is an equation expressing the relationship between the reaction current density $i_{loc}$ and the reaction current density $i_{tot}$ per volume. $S_v$ is a specific surface area per unit volume (m$^2$/m$^3$). $S_v$ may be expressed by a function of a radius $r_0$ of the active material particle.

$$i_{tot} = S_v i_{loc} \quad \text{[Mathematical formula 34]}$$

Figure 8:
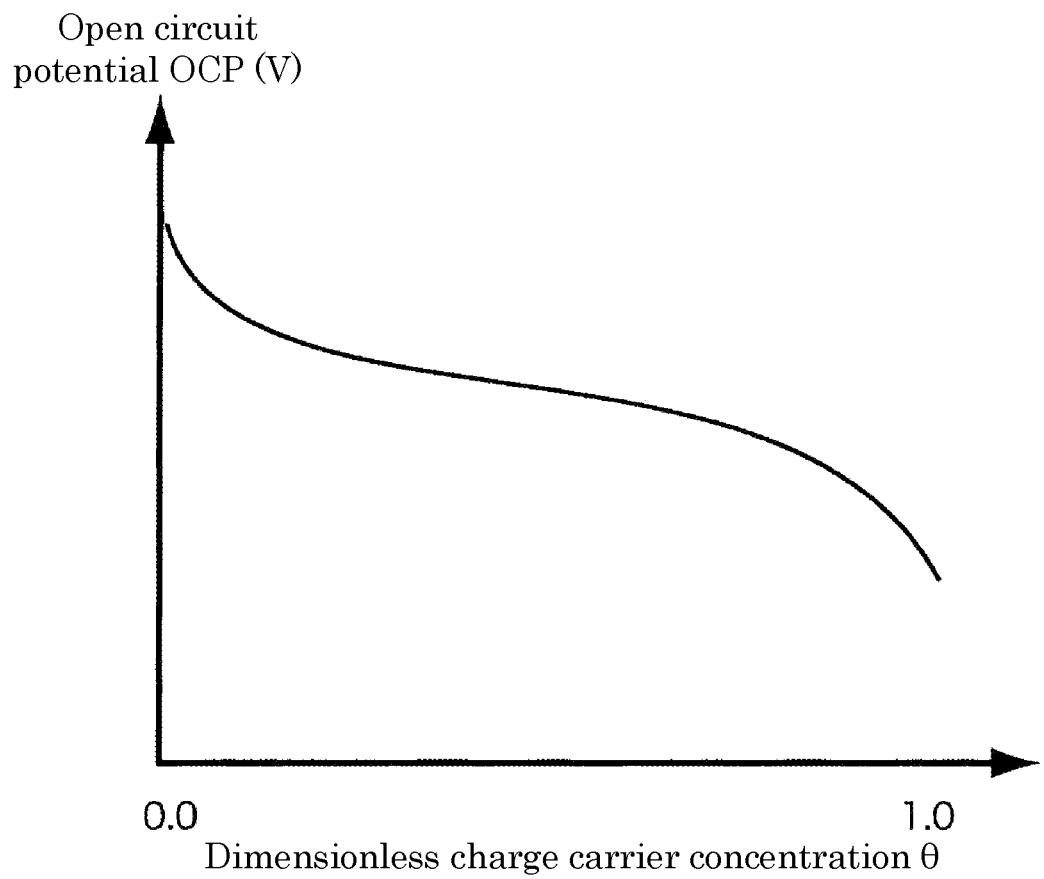
FIG. 8 is a graph illustrating a relationship between a stored lithium ion concentration in a solid phase and an open circuit potential (OCP) in a typical positive electrode material.

FIG. 8 is a graph illustrating a relationship between the stored lithium ion concentration in the solid phase and an open circuit potential (OCP) in a typical positive electrode material. $\theta$ is a dimensionless number defined by Mathematical formula 35, and is a function of a stored lithium ion concentration $c_s$. $c_{smax}$ is the stored lithium ion concentration (mol/m$^3$) in the solid phase during the end of discharge (=during the lower limit voltage) at the point of time (that is, zero cycle) when the battery is not degraded at all during the battery manufacturing. On the other hand, $c_{smin}$ is the stored lithium ion concentration (mol/m$^3$) in the solid phase during the initial of discharge (=during the upper limit voltage=during full charge) at the point of time (that is, zero cycle) when the battery is not degraded at all during the battery manufacturing. $\theta$=0.0 because of $c_s=c_{smin}$ during the full charge, and $\theta$=1.0 $c_s=c_{smax}$ during the end of discharge, so that $\theta$ changes from 0.0 to 1.0 on the average as the battery is discharged. As described above, the open circuit potential OCP of the positive electrode is expressed as the function of the positive electrode $\theta$. In the same way, the open circuit potential OCP of the negative electrode is also expressed as the function of the negative electrode $\theta$. In the negative electrode, it is noted that $\theta$=1.0 at the beginning of discharge and $\theta$=0.0 at the end of discharge.

$$\theta = \frac{c_s - c_{smin}}{c_{smax} - c_{smin}} \quad \text{[Mathematical formula 35]}$$

The above is a general description of the Newman model, but for example, when a transport number $t_+ \approx 1.0$ of cations (positive ions), the second term on the right side of the first equation of Mathematical formula 2 can be ignored. In this case, the current in the liquid phase is calculated by Ohm's law. A term having strong nonlinearity can be ignored, so that calculation stability can be improved while a calculation load is reduced.

The Butler-Volmer equation is used as the equation expressing the activation overvoltage in the charge transfer reaction. However, a Tafel formula may be alternatively used. Furthermore, it may be given in the form of arbitrary table data. The exchange current density may be a function of the stored lithium ion concentration in the electrode, the electrode composition, the SOC, or the temperature. The diffusion equation of the charge carrier in the solid phase described in Mathematical formula 4 may be omitted when the influence of the concentration overvoltage is negligible or when the calculation load is reduced.

Temperature dependency is imparted to the formula (that is, a Butler-Volmer equation) of the reaction resistance in this model, the ion conductivity, the ion diffusion coefficient, the diffusion coefficient of the stored lithium ion in the active material, or other physical property values, and the temperature estimated value obtained from the estimation device 100 is imparted to the simulation of the Newman model as an input condition, so that the precise charge-discharge characteristic simulation can be performed.

Alternatively, a single particle model in which the electrode is expressed by a single active material particle may be used. For example, a model disclosed in Non Patent Document "Single-Particle Model for a Lithium-Ion Cell: Thermal Behavior, Meng Guo, Godfrey Sikha, and Ralph E. White, Journal of The Electrochemical Society, 158 (2) 122-132 (2011)" may be referred to as the single particle model. The single-particle model is a model that is obtained by simplifying the above-described Newman model and assumes that all the active material particles constituting the positive and negative electrodes are the same. The temperature dependency is imparted to the formula (that is, a Butler-Volmer equation) of the reaction resistance in this model, the ion conductivity, the ion diffusion coefficient, the diffusion coefficient of the stored lithium ion in the active material, or other physical property values, and the temperature estimated value obtained from the estimation device 100 is imparted to the simulation of the single-particle model as the input condition, so that the precise charge-discharge characteristic simulation can be performed.

Alternatively, a polynomial model in which the open circuit voltage OCV and the internal resistance are expressed by a power function of the temperature and the SOC may be used. For example, a model disclosed in Non-Patent Document "Modeling the Dependence of the Discharge Behavior of a Lithium-Ion Battery on the Environmental Temperature, Ui Seong Kim, Jaeshin Yi, Chee Burm Shin, Taeyoung Han, and Seongyong Park, Journal of The Electrochemical Society, 158 (5) 611-618 (2011)" may be referred to as the polynomial model. The precise charge-discharge characteristic simulation can be performed by imparting the temperature estimated value described in the embodiment as an input condition to the simulation of the polynomial model.

Further alternatively, the precise charge-discharge characteristic simulation can be performed using the estimation device 100 as long as a model that expresses the characteristic of the energy storage element 200 and in which the input of the temperature is required.

Application Example 3

The temperature distribution in the energy storage device 20 can be estimated using the estimation device 100. An appropriate cooling condition or heating condition may be determined based on the estimated temperature distribution. Examples of the cooling condition and the heating condition include an air volume, a wind direction, and an air temperature in the case of air cooling, and include a refrigerant flow rate and a refrigerant temperature in the case of water cooling. Feedback control such as PID control or on/off control may be used as a method for determining the condition.

Application Example 4

Abnormal heating of the energy storage element 200 can be estimated using the estimation device 100. The estimated temperature of the energy storage element 200 may become an abnormal value (abnormal values are often higher than normal). Because there is a possibility that such an energy storage element 200 is in an abnormal state due to an internal short-circuit or the like, it is desirable to immediately take measures such as disconnection.

Application Example 5

The use of the estimation device 100 enables more precise degradation prediction simulation even in the case where the estimation device is based on limited temperature information. Specifically, more precise degradation prediction can be performed using the temperature estimated by the estimation device 100 as the temperature included in the known degradation prediction formula. In particular, in the storage battery system in which the assembled battery formed by connecting the plurality of battery cells in series is used, because the performance of the battery cell having a large degradation has the very large influence on the performance of the entire battery system, it is very useful to perform the more precise degradation prediction using the temperature estimated value obtained by the estimation device 100.

It is known that a degradation behavior of the battery is strongly affected by the temperature. Although the more accurate simulation can be performed by accurately considering the temperature, the observable amount is practically limited, and there is a problem that the accuracy is poor in the simulation based only on the sensor measurement amount. The accuracy of the degradation prediction can be improved by performing the temperature correction by the present method to make the temperature information more accurate.

As a method for performing the more accurate degradation prediction, it is conceivable to perform the degradation calculation using history data corrected using the temperature observer of the present application based on the observation amount of the actually observed current, voltage, temperature, and the like.

It is known that there are at least four types of degradation mechanisms of battery typified by the lithium ion battery: (1) isolation of active material particles, (2) a decrease in charge carriers, (3) an increase in electric resistance, and (4) a decrease in conductivity in the electrolyte solution. These degradation mechanisms contribute in combination to change charge-discharge characteristics of the battery, and cause capacity reduction.

The temperature is particularly required among factors that determine the progress rate of the degradation. For this reason, the temperature is also required to be precisely grasped from the viewpoint of the degradation prediction. For example, the estimation device 100 can determine the degradation progress rate on the assumption that the estimation device has the temperature dependency based on the Arrhenius type reaction rate equation. Alternatively, the estimation device 100 may determine the degradation progression rate based on a function of any other temperature. It is known that the degradation includes time dependent degradation (sometimes referred to as calendar degradation) that performs the degradation with time and cycle degradation that performs the degradation according to the number of cycles, and it has been checked by experiments and the like that both the deteriorations become the function of the temperature.

The estimation device 100 may simulate the degradation of the energy storage device 20 based on the determined degradation progression rate. For example, a technique disclosed in Patent Document "Japanese Patent Application No. 2019-064218: Development support device, development support method, and computer program" may be used as the degradation prediction method.

For example, the arithmetic unit 101 of the estimation device 100 calculates the speed at which the electric resistance increases by the following Mathematical formula 36 or Mathematical formula 37, namely, the speed at which electric conductivity decreases.

[Mathematical formula 36]
$$r_{cycle,res} = -k_{0,res}(N)\exp\left(-\frac{E_{a0,res}}{RT}\right)|i|^{a_{res}}$$

Where $r_{cycle,res}$ expresses a speed (S/m/cycle number) at which the electric conductivity decreases depending on the cycle number. Typically, $r_{cycle,res} < 0$. $k_{0,res}$ is a reaction rate constant, and for example, is a function of the cycle number. $E_{a0,res}$ expresses activation energy (J/mol) of the cycle degradation, and is a coefficient expressing the influence of temperature. i is current density (A/m$^2$), and || expresses an absolute value. When the number of cycles cannot be clearly defined like the electric vehicle battery, for example, an expression in which the number of cycles does not appear may be used by setting the reaction rate to a constant.

$$r_{t,res} = -k_{1,res}(t)\exp\left(\frac{-E_{a1,res}}{RT}\right)\Delta t \quad \text{[Mathematical formula 37]}$$

At this point, $r_{t,res}$ expresses a speed (S/m/s) at which the electric conductivity decreases with the elapsed time. Typically, $r_{t,res}<0$. $k_{1,res}$ is a reaction rate constant, and for example, is a function of time. Alternatively, $k_{1,res}$ may be defined by any function based on experimental data. $E_{a1,res}$ expresses activation energy (J/mol) of time degradation, and is a coefficient expressing the influence of the temperature. At is an elapsed time (s). The speed at which the electric conductivity decreases becomes the sum of Mathematical formula 36 and Mathematical formula 37.

The arithmetic unit 101 of the estimation device 100 calculates the speed at which the isolation of the active material particles progresses by Mathematical formula 38 or Mathematical formula 39.

$$r_{cycle,iso} = -k_{0,iso}(N)\exp\left(-\frac{E_{a0,iso}}{RT}\right)|i|^{a_{iso}}$$ [Mathematical formula 38]

Where $r_{cycle,iso}$ expresses the speed (1/cycle number) at which the isolation of the active material particles progresses depending on the cycle number. Typically, $r_{cycle,iso}<0$. $k_{0,iso}$ is a reaction rate constant, for example, is a function of the cycle number. $E_{a0,iso}$ expresses activation energy (J/mol) of the cycle degradation, and is a coefficient expressing the influence of temperature. i is the current density (A/m²). When the number of cycles cannot be clearly defined like the electric vehicle battery, for example, an expression in which the number of cycles does not appear may be used by setting the reaction rate to a constant.

$$r_{t,iso} = -k_{1,iso}(t)\exp\left(-\frac{E_{a1,iso}}{RT}\right)\Delta t$$ [Mathematical formula 39]

Where $r_{t,iso}$ expresses (1/s) that is the speed at which the isolation of the active material particles progresses depending on the elapsed time. Typically, $r_{t,iso}<0$. $k_{1,iso}$ is a reaction rate constant, for example, is a function of time. Alternatively, $k_{1,iso}$ may be defined by any function based on experimental data. $E_{a1,iso}$ expresses the activation energy (J/mol) of the time degradation, and is a coefficient expressing the influence of temperature. At is an elapsed time (s). The speed at which the isolation progresses is the sum of Mathematical formula 38 and Mathematical formula 39.

A decrease in charge carrier involved in the charge and discharge will be described as a third degradation mechanism. The degradation mechanism due to the decrease in charge carriers is a phenomenon in which ions in the electrolyte solution disappear due to a side reaction on the surface of the electrode during the charge.

The third degradation mechanism is known to be accelerated by both the time and cycle for the lithium ion battery. During the charge, as expressed by the reaction formula of $Li^{+}+e^{-}+6C+P \rightarrow xLiC6+(1-x)Li_{SEI}$, a byproduct of $Li_{SEI}$ is generated in addition to the main reaction in which Li is generated (ideally x=1). P is a substance as a base of the byproduct. At this point, x:(1-x) is a stoichiometric ratio of main reaction:side reaction. Usually because of (1-x)/x<<1, the stoichiometric coefficient of the side reaction is very small. The lithium ion obtained by multiplying the stoichiometric coefficient of the side reaction by the current density and the surface area of the electrode and dividing the product by the Faraday constant disappears from the electrolyte solution. In order to express the mechanism, assuming that the lost amount of $Li^{+}$ in the liquid phase is $J_{Li+}$ (mol/m²s), the amount of Li flowing into the solid phase $J_{Li}$ (mol/m²s) may be $J_{Li}=xJ_{Li+}$.

x may be a function of the upper limit $SOC_{max}$ and the lower limit $SOC_{min}$, the temperature T, and the current density i as appropriate. For example, a function as described in Mathematical formula 40 may be used. h is any function defined to fit experimental data. Note that $0.0 \le x \le 1.0$.

$$x=h(SOC_{max},SOC_{min},T,|i|)$$ [Mathematical formula 40]

The side reaction is generated not only at the time of charge but also without energization, but it is preferable to give a disappearance rate ru of the lithium ion as a function of time ($r_{Li}=g(t)$) based on the measured data. A function proportional to the square root of the time t is often used as the function g. The function g may further include a factor related to the temperature. The rate at which the charge carriers involved in the charge and discharge decrease is the sum of $J_{Li+}$ and $r_{Li}$.

The decrease in conductivity in the electrolyte solution will be described as a fourth degradation mechanism. The degradation mechanism due to the decrease in conductivity in the electrolyte solution is mainly the decrease in conductivity due to the disappearance of the charge carriers. The disappearance of the charge carrier is mainly generated when the resistance film is formed on the surface of the active material particle.

Figure 9:
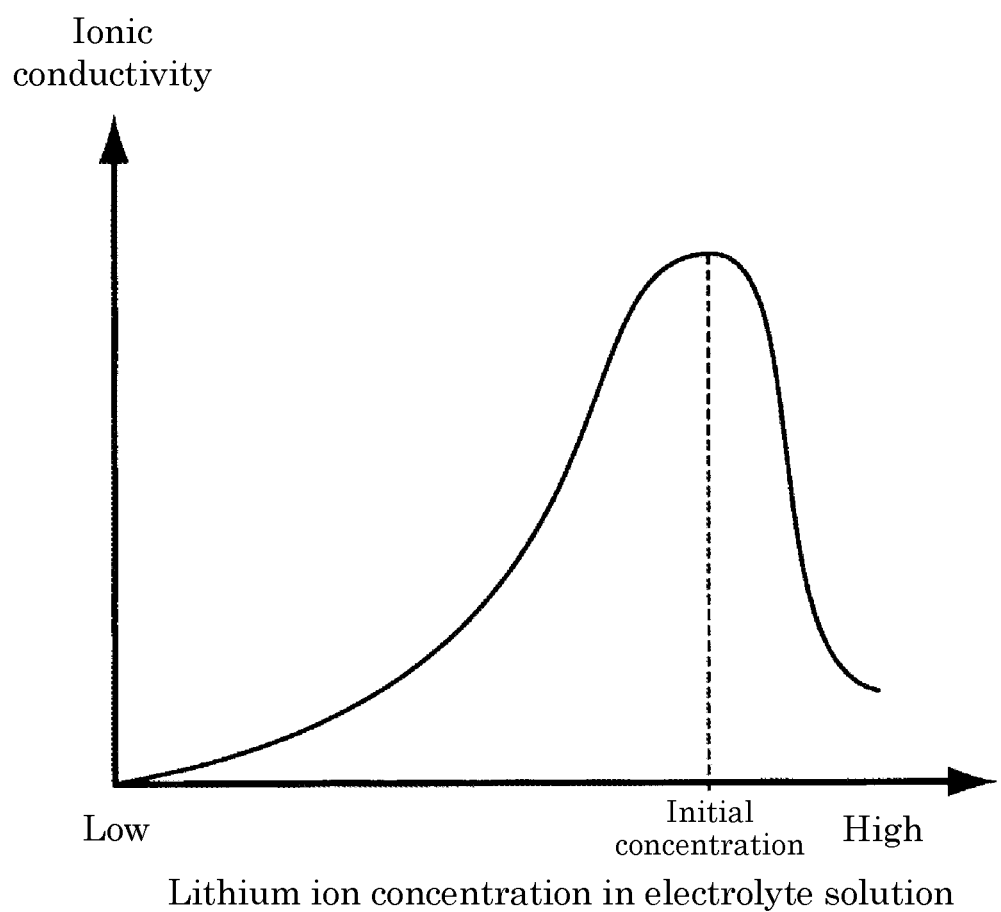
FIG. 9 is a graph illustrating a relationship between a lithium ion concentration in an electrolyte solution and ionic conductivity.

It is known that the lithium ion in the electrolyte solution decrease when the charge and discharge are repeated. The conductivity of the electrolyte solution is a function of the lithium ion concentration, and is generally maximum at the time of initial production, but is known to decrease as the lithium ion concentration decreases. FIG. 9 is a graph illustrating a relationship between the lithium ion concentration in the electrolyte solution and the ionic conductivity. In the graph of FIG. 9, a horizontal axis indicates the lithium ion concentration in the electrolyte solution, and a vertical axis indicates the ionic conductivity. The relationship between the lithium ion concentration in the electrolyte solution and the ionic conductivity often becomes the relationship in FIG. 9. The arithmetic unit 101 of the estimation device 100 can calculate the decrease rate of the conductivity by the same function as Mathematical formula 36 and Mathematical formula 37.

Application Example 6

The values of $Q_1$ to $Q_5$ described in Mathematical formulas 1 to 4 may be calculated based on the battery model described in (Application Example 1) and (Application Example 2).

That is, it should be understood that the embodiments disclosed herein are illustrative in all points and not restrictive. The scope of the present invention is illustrated by not the above meanings, but the scope of the claims, and is intended to include all changes within the scope of the claims and meaning equivalent to the scope of the claims.

For example, the energy storage device 20 may include a module in which a plurality of cells are connected in series, a bank in which a plurality of modules are connected in series, and a domain in which a plurality of banks are connected in parallel. When the energy storage device 20 is the bank including a plurality of modules, the estimation device 100 may acquire the temperature measured for some of the modules as the element temperature, and estimate the temperature of each energy storage element 200 (in this example, the temperature of each module) including the temperature of the module that is not measured. Similarly, when the energy storage device 20 is the domain including a plurality of banks, the estimation device 100 may acquire the temperature measured for some of the banks as the element temperature, and estimate the temperature of each energy storage element 200 (in this example, the temperature of each bank) including the temperature of the bank that is not measured.

The invention claimed is:

1. An estimation device comprising:
an acquisition unit that acquires a measurement result from a temperature sensor that measures a temperature at a specific position to which heat generated from a plurality of energy storage elements within an energy storage device is transferred;
an observer that estimates a temperature at a position where the temperature sensor does not measure a temperature in response to input of the measurement result and based, in part, thereon and on an environmental temperature of the energy storage device; and
an arithmetic unit that calculates a speed as to a degradation of the plurality of energy storage elements based upon the measurement result, the estimate, and a change of one or more characteristics of the plurality of energy storage elements.

2. The estimation device according to claim 1, wherein the observer estimates a temperature at a position where the temperature sensor does not measure a temperature by deriving a state variable based on a state equation simulating heat conduction in the energy storage device and an observation equation expressing a relationship between the state variable in the state equation and an observation variable observable by the temperature sensor.

3. The estimation device according to claim 2, wherein the observer includes an internal parameter designed in such a manner that an estimated temperature by the observer and a measured temperature by the temperature sensor asymptotically approach each other.

4. The estimation device according to claim 1, wherein the observer includes an internal parameter designed in such a manner that an estimated temperature by the observer and a measured temperature by the temperature sensor asymptotically approach each other.

5. The estimation device according to claim 1, wherein:
the temperature sensor is provided in the energy storage device, and
the observer estimates a temperature outside the energy storage device based on a temperature of the energy storage device measured by the temperature sensor.

6. The estimation device according to claim 1, wherein in the observer, an observer gain is formulated by a Kalman filter.

7. The estimation device according to claim 1, wherein the estimation device is configured as a server device disposed separately from the energy storage device.

8. The estimation device according to claim 1, wherein the simulation of the degradation prediction of the energy storage device is simulation based on a physical model of the energy storage device.

9. An estimation method comprising the steps of:
acquiring a measurement result from a temperature sensor that measures a temperature at a specific position to which heat generated from a plurality of energy storage elements within an energy storage device is transferred;
estimating a temperature at a position where the temperature sensor does not measure a temperature based upon an environmental temperature of the energy storage device and by inputting the measurement result to an observer that estimates a state variable based on a state equation simulating heat conduction in the energy storage device and an observation equation expressing a relationship between the state variable in the state equation and an observation variable observable by the temperature sensor; and
calculating a speed as to a degradation of the plurality of energy storage elements based upon the measurement result, the estimate, and a change of one or more characteristics of the plurality of energy storage elements.

* * * * *